United States Patent [19]
Lichti et al.

[11] Patent Number: 6,011,998
[45] Date of Patent: Jan. 4, 2000

[54] HIGH SPEED PICKING SYSTEM

[76] Inventors: Wayne Lichti, 157 Meadow Rd.;
Robert D. Lichti, P.O. Box 1489, both of Chester, Calif. 96020

[21] Appl. No.: 08/853,986

[22] Filed: May 9, 1997

[51] Int. Cl.[7] .............................. B07C 17/00; G07F 7/00; B65G 1/00
[52] U.S. Cl. .................... 700/230; 700/218; 700/225; 700/214; 700/228; 414/273; 414/268
[58] Field of Search ................... 700/230, 218, 700/225, 223, 214, 213, 224, 215, 217, 228, 226, 229; 198/349.6, 349.7; 414/273, 225, 226, 268, 283

[56] References Cited

U.S. PATENT DOCUMENTS

| | | | |
|---|---|---|---|
| 4,542,808 | 9/1985 | Lloyd et al. | 364/478.17 |
| 5,007,521 | 4/1991 | Tanaka | 364/478.11 |
| 5,040,056 | 8/1991 | Sager et al. | 364/478.18 |
| 5,084,829 | 1/1992 | Kato | 364/478.06 |
| 5,161,929 | 11/1992 | Lichti, Sr. et al. | 364/478.16 |
| 5,175,690 | 12/1992 | Berthier et al. | 364/478.02 |
| 5,209,626 | 5/1993 | Lichti, Sr. et al. | 364/478.18 |
| 5,226,782 | 7/1993 | Rigling | 364/478.06 |
| 5,271,703 | 12/1993 | Lindqvist et al. | 414/268 |
| 5,273,392 | 12/1993 | Bernard, II et al. | 364/478.06 |
| 5,293,322 | 3/1994 | Yagi et al. | 364/478.05 |
| 5,299,134 | 3/1994 | Speckhart et al. | 364/478.12 |
| 5,439,345 | 8/1995 | Ivo | 414/797.9 |
| 5,568,393 | 10/1996 | Ando et al. | 364/478.02 |
| 5,713,718 | 2/1998 | Okura et al. | 414/797.9 |
| 5,720,157 | 2/1998 | Ross | 364/478.11 |
| 5,810,061 | 9/1998 | Yuyama | 198/349.6 |

FOREIGN PATENT DOCUMENTS

3711237  10/1988  Germany ........................... 198/349.6

*Primary Examiner*—William E. Terrell
*Assistant Examiner*—Wonki K. Park
*Attorney, Agent, or Firm*—Bruce A. Jagger

[57] ABSTRACT

An automated material handling picking system including a plurality of storage locations for objects which are to be picked, a moveable picking head for picking the objects from the storage locations, a moving conveyor including a plurality of receiving locations where the picked objects are to be consolidated into separate orders or sub-sets, and a bank of queue stations for temporarily holding the picked objects and selectively releasing them into the respective receiving locations where the sub-sets are to be consolidated. The picking head deposits a picked object into the nearest available queue station. The picking head is not involved in the consolidation of the objects into sub-sets because of the buffering effect of the queue stations. Preferably, only one object at a time is held in each queue. The release of the objects from the queue stations is coordinated so that all of the objects for a particular sub-set are released by the respective queue stations into one receiving location on the moving conveyor. The picking sequence is preferably based on the proximity of the object to the picking head, rather than on the object's inclusion in any particular sub-set. The normally more efficient proximity based picking sequence is made possible by the buffering effect of the queue stations.

11 Claims, 5 Drawing Sheets

HIGH SPEED PICKING SYSTEM

BACKGROUND OF THE INVENTION

1. Field of the Invention

The invention relates in general to automated material handling, and, in particular, to a high speed picking system.

2. Description of the Prior Art

Previous high speed automated picking systems generally required that the picking head travel at high speeds and accelerate and decelerate at high rates so that substantial G forces were generated. This created control difficulties and placed great demands on the mechanisms. In general, previous automated picking systems were designed so that, in response to the receipt of several orders, each for several different objects, the picking head picked objects from several different storage containers and consolidated them by order in handling or shipping receptacles. The sorting of the orders into the receiving receptacles was generally accomplished by the picking head. The picking was generally done sequentially, that is, all of the objects for one order were picked and placed in the receiving receptacle before any of the objects for the next order were picked. The objects to be picked were generally distributed throughout several different storage containers. The picking head was thus required to travel substantial distances between storage containers and the receiving receptacle, passing over objects which would be needed to fill the next or subsequent orders. Further, the receiving receptacles were generally located on conveyors so that they were continually moving. This required the picking head to coordinate with the movement of the conveyor. The picking head was continually required to reverse directions, and accelerate to and travel at high speeds over considerable distances. Because of the velocities and acceleration forces, the structural and power requirements to drive the picking head and its components were very substantial.

Those concerned with these problems recognize the need for an improved picking system. These and other difficulties of the prior art have been overcome according to the present invention.

BRIEF SUMMARY OF THE INVENTION

A preferred embodiment of the picking system according to the present invention comprises a system wherein at least one picking head moves in picking relationship to a plurality of supply locations, and in dispensing relationship to a plurality of queue stations, so as to fulfill a plurality of orders for multiple different objects in parallel rather than sequentially.

The picking head can be moveably mounted for movement in at least two axes over stationary supply locations and/or stationary queue stations. Alternatively, the picking head can be mounted for movement in only one axis or it may be provided with a stationary mount relative to one or both of the supply locations and the queue stations. One or both of the supply locations and queue stations can be mounted for movement in at least one axis. The movement of the picking head, storage locations and queue stations can be linear or arcuate as may be desired.

The picking head does not perform the consolidation of the various objects into individual orders or sub-sets. The queue stations are mounted in consolidating relationship with receiving receptacles or locations, preferably on a moving conveyor or conveyors. Consolidation is accomplished by reason of the fact that the queue stations selectively release their objects to those receiving or consolidating locations which have been predetermined to be the ones to receive the various objects in a particular sub-set. The movement of the picking head does not need to be coordinated with the locations of the consolidating locations because the queue stations act as buffers between the picking head and those locations. The picking phase is thus buffered or separated from the consolidation phase.

The picking head preferably picks objects in the most efficient sequence, that is, with the least wasted motion, from the entire work list of objects for a plurality of orders or sub-sets, and delivers each of those picked objects to the nearest available queue station. The picking is accomplished without regard to which specific order or sub-set the object is destined for. The objects which make up a particular sub-set are then selectively dispensed from the respective queue stations in coordination, for example, with a continuously moving conveyor which is carrying a receiving location for the particular sub-set. Each picked object is released from its queue station into the receiving location which is designated to receive objects for that sub-set, when the location is moved into position to receive it. The picking head is thus enabled to pick a large number of objects from the work list for several different sub-sets in one pass relative to the storage locations, without the necessity for substantial reversal of direction. It does not need to pass up an object which will be needed for the fourth sub-set just because the last object picked was for the first sub-set.

The entire work list of required objects is continuously compared to the list of the objects which are in the available storage containers. The picking head picks, from the list of objects on the work list that object which is closest to it, all without regard to which specific sub-set the picked object belongs with. Preferably, the picking head moves in one direction relative to the storage containers so that it continually picks from the current work list the object which is closest to it in the direction in which it is moving relative to the storage containers, that is, downstream from its current position. The relative movement between the picking head and the queue stations is such that the picking head follows the shortest available path to a queue station by going to the closest available queue station to the storage location from which the object was picked. The picking head thus picks many more objects in a given period of time with much lower velocities and lower acceleration loads being imposed on the components of the system, as compared to prior proposed expedients which picked on sub-set priority and attempted to consolidate directly with the picking head.

The consolidation of individual orders in receiving receptacles or locations on a moving conveyor is accomplished, for example, through coordination between the queue stations and the moving conveyor. It is not necessary to coordinate the discharge of objects from the queue stations with the movement or position of the picking head. Once the objects for a sub-set have been placed in the respective queue stations, no further coordination with the picking head is required. Throughput rates are thus greatly increased, and equipment and power requirements are greatly reduced. Capital costs, operating costs and maintenance costs are greatly reduced.

Conventional computer control, data storage and manipulation, and coordination are provided to carry out the necessary steps and operations in the automated picking system of the present invention. In general, data and information are entered, stored, maintained, and provided when required, by a conventional computer system. The conventional computer system also keeps track of the location of every object, and the status of all operating devices, at all times within the system. Orders for the delivery of objects from the system, and information on the status of the fulfillment of such orders, are received and maintained at all times by the conventional computer system. Where several like objects are present in one location, records of the changes in the object count at that location are maintained. Conventional computer programing instructions are provided to cause the physical elements of the system to respond as desired to the data maintained by the computer system. Conventional sensors, such as, for example, bar code readers, are provided throughout the system, as required for monitoring purposes. Conventional interface devices are provided between the computer system and the other elements of the system so that control and coordination functions can be performed by the computer system. The conventional computer system coordinates the operation of the system based on the received and stored information and according to the instructions provided to it.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of material handling operations. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed. The descriptions of each of the various illustrated embodiments and their operations are generally applicable to all embodiments except where there are obvious differences.

Referring particularly to the drawings for the purposes of illustration only and not limitation.

DETAILED DESCRIPTION OF THE PREFERRED EMBODIMENTS

Figure 1:
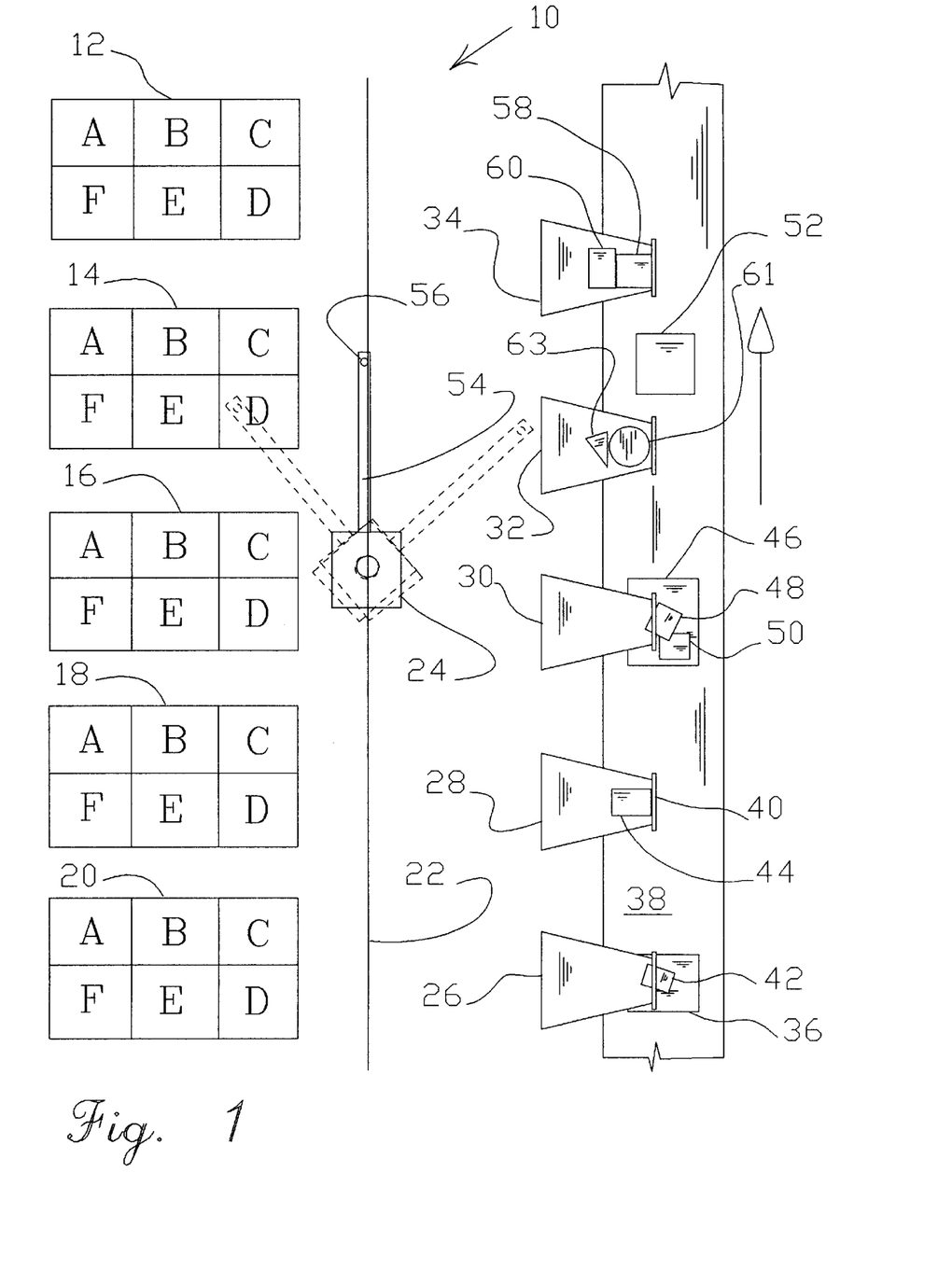
FIG. 1 is a schematic view of an embodiment of the invention.

Referring particularly to FIG. 1 of the drawings, there is schematically illustrated generally at 10, a picking station which includes typical storage containers 12, 14, 16, 18, and 20, a picking head 24 moveably mounted on a rail 22, a conveyor 38 and typical queue stations 26, 28, 30, 32, and 34 arranged in a bank in dispensing relationship to the conveyor 38.

Each of storage containers 12 through 20 includes a plurality of compartments, typical ones of which are indicated as A through F. Conventional computer systems are provided to coordinate and control the picking system, including, for example, maintaining a real time inventory of the objects in the system together with their locations and work lists of the objects to be picked, and coordinating and controlling the various mechanical elements of the system so as to accomplish the necessary picking and sorting of objects. Preferably, the storage containers are stored somewhere else, for example, on a rotary storage carousel, from whence they are called upon demand, and returned to when no longer needed. As the system is operated storage containers are frequently supplied to and removed from the picking station 10.

Picking head 24, through arm 54 and grasping element 56, is adapted to pick objects out of storage containers 12 through 20 and deliver them to the gravity chutes which form part of queue stations 26 through 34. Picking head 24 is mounted for movement along the length of rail 22, as well as pivotal movement from side to side so as to swing arm 54 to the desired location. Arm 54 is, for example, telescoping in nature so as to allow it to reach each compartment in each storage container, and, also, to reach the nearest available queue station. The necessary movement of the picking head is accomplished by a combination of the longitudinal and pivotal movement of the picking head 24 together with the preferred telescoping of arm 54. The grasping element is, for example, a vacuum cup or mechanical clamp.

The picking arm retrieves an object from a storage container, carries that object to the nearest available queue station and deposits it there. The nearest available queue station may not be the closest to such storage container. If the nearest queue station already contains an object which belongs to a different order from the one with which the object being carried by the picker arm is associated, the next closest empty queue station is selected.

A queue station need not be empty to be a candidate to receive the object which is currently carried by the picker arm. If the nearest queue station already contains an object which is part of the same order as the object which the picker arm is carrying, the object can be deposited at that queue station. Conventional computer hardware and software systems control and coordinate the operation of the system so that although the picking head picks objects without regard to which order they belong in, it generally deposits the picked objects either in empty queue stations or in queue stations which already contain objects which are a part of the same order.

A large number of queue stations are provided so that the picking head never has far to travel to find an empty station. The control and coordination can generally be simplified somewhat, if desired, by providing that objects will only be deposited in empty queue stations. The control and coordination which is required for the partial or full consolidation of orders in the queue stations is not required for such a system. All consolidating of orders then takes place in the first instance in the receiving receptacles.

A system configuration where each queue station holds only one object at a time is most efficient when a large number of queue stations are provided relative to the number of compartments in the storage containers. There can, for example, be as many as 1 queue station for each 12, and preferably, for each 4 to 10, storage locations. Each storage location generally holds only identical objects, whether that location comprises an entire storage container or some portion of a larger container. Thus, the term "compartment" is used to designate a location where only one specific type of object is found. Preferably there are no more than from about 4 to 12 such locations per queue station.

Specially designed Queue stations can be provided, if desired, which permit objects from different orders to be held in the same queue station and selectively dispensed. The equipment and controls necessary to operate a system where such unrelated objects are held in the same queue station is somewhat more complicated than that which is required to operate a system where a queue station only holds one object at a time. Throughput rates are, however, generally increased.

The queue stations 26 through 34 are mounted in fixed locations between the moving picking head 24 and the moving conveyor 38. The queue stations can, for example, include gravity feed chutes which are provided with remote controlled gates at the lower ends thereof. One typical such gate is illustrated, for example, at 40. The gates remain closed until a designated receiving receptacle such as those illustrated, for example, at 36, 46 and 52, passes by on the conveyor to receive the object or objects contained in the queue station with which the gate is associated. The gate is then opened to discharge the object or objects from the queue station into the designated receiving receptacle.

Conventional computer information storage and controls (not shown) are provided to coordinate the movement of the conveyor, the locations of the various receiving receptacles, the locations of the various picked objects in the various queue stations, and the opening and closing of the various gates. All of the objects for a particular order are picked and placed in various queue stations before the receiving receptacles pass by those respective queue stations. The system can be operated so that the objects for an order are all picked and placed in their respective queue stations before the receiving receptacle is launched onto the conveyor. In general, the period of time between the completion of the picking of objects for an order and the depositing of the objects into a receptacle is relatively short so that the queue stations are made available to receive newly picked objects as soon as possible. In a configuration where objects for different orders may be held in one queue station and selectively dispensed, the period of time between picking and consolidation in the receiving receptacles can generally be considerably increased. Thus, for example, objects 42 and 44 may be part of one order, and that order is being consolidated in receptacle 36. Object 50 was deposited in receptacle 46 at a previous queue station, and the gate to queue station 30 is open so as to allow object 48 to be received by receptacle 46. Objects 58 and 60, for example, are scheduled to be deposited from queue station 34 into receptacle 52 when it is carried by conveyor 38 into registry with the discharge side of queue station 34. The conveyor 38 preferably moves at a constant rate. The system accommodates different sizes and shapes of objects as shown, for example, at 58, 60, 61 and 63.

Figure 2:
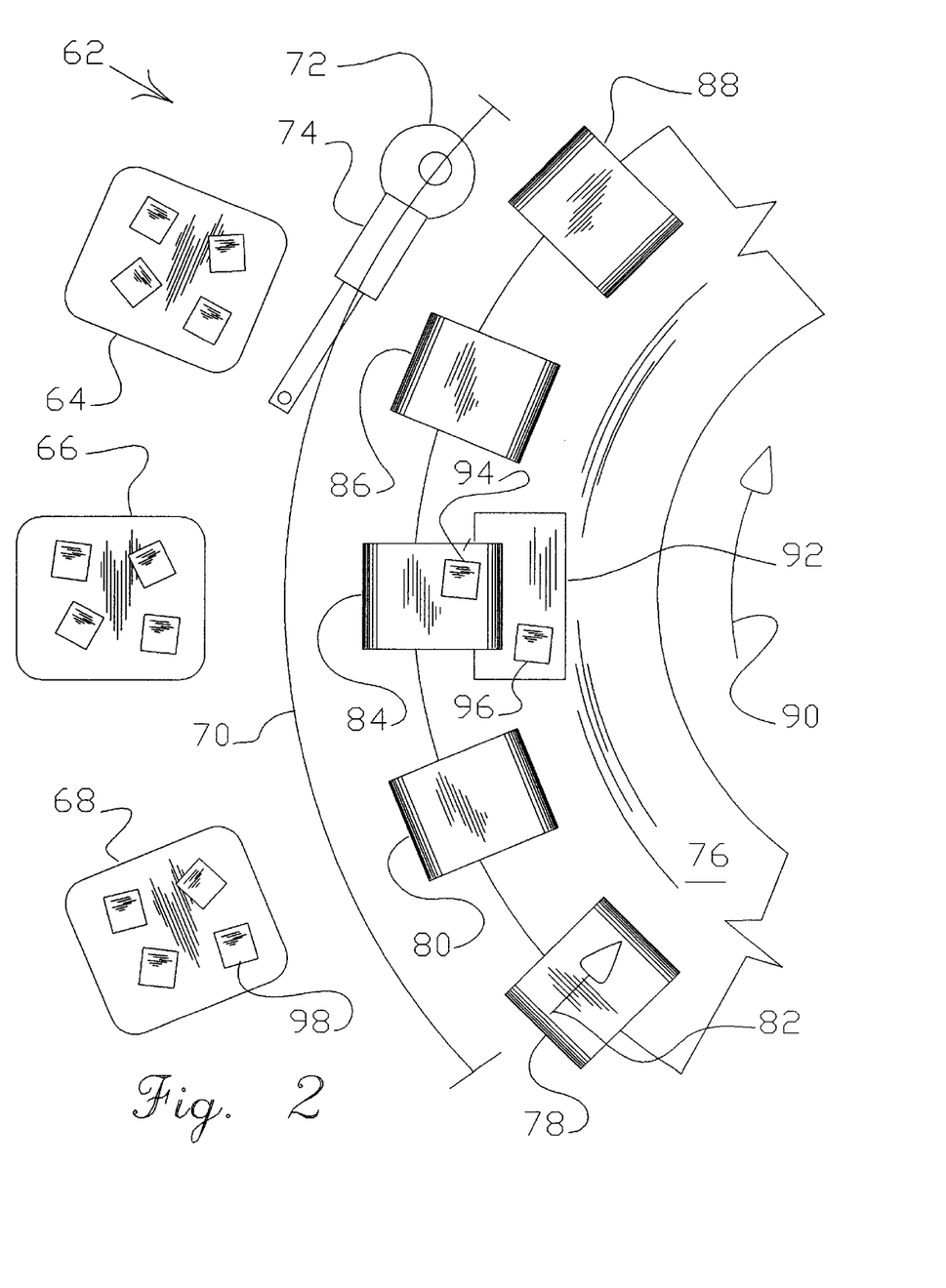
FIG. 2 is a schematic view of a further embodiment of the invention.

A picking station with an arcuate configuration is schematically illustrated generally at 62 in FIG. 2. Storage containers or totes, typical ones of which are illustrated at 64, 66, and 68, are positioned in an arcuate array adjacent to arcuate track 70. Arcuate track 70 supports picking head 72 for reciprocal movement along an arc which is generally concentric with the array of storage containers 64 through 68, the array of queue stations, typical ones of which are illustrated at 78, 80, 84, 86, and 88, and the rotary conveyor 76. The rotary conveyor 76 can, for example, take the form of a rotary table, an arcuate belt, powered rollers, overlapping panels, or the like. Telescoping picking arm 74 functions to pick objects from the storage containers, carry them to the queue stations, and deposit them at the nearest available queue station. A typical object provided to the picking station 62 in the storage containers is illustrated at 98.

The queue stations which were chosen for illustration in FIG. 2 generally comprise, for example, short belt conveyors which are driven intermittently in the direction indicated at 82. The short conveyors which comprise the queue stations can, for example, be continuous belts trained over rollers, powered rollers, moving plates, or the like. Preferably, the driving mechanism for the queue stations is positively linked to the moving elements so that precise positioning is maintained for purposes of control and coordination. Rotary conveyor 76 carries receptacles, preferably at a continuous rate in the direction indicated at 90, past the various queue stations. A typical receiving receptacle is illustrated, for example, at 92. Receptacle 92 already contains an object 96 which it received at an earlier queue station. Receptacle 92 is in position to receive an object 94. Object 94 had been placed on the conveyor belt which comprises station 84 at some earlier point in time. At the point in time when object 94 was placed on queue station 84, the conveyor belt which comprises that station was stationary. With receiving receptacle 92 having been carried by continuously moving rotary conveyor 76 into position to receive object 94, activation of the intermittently driven conveyor belt will deposit object 94 into receptacle 92.

The arcuate configuration in the embodiment of FIG. 2 can assume various configurations other than that which was chosen for illustration. The storage locations can, for example, be located on a vertically mounted cylinder which rotates about its own vertical axis with a picking member mounted for movement in one axis parallel to the vertical axis of the cylinder. As the cylinder rotates and the picking member moves axially along the surface of the cylinder, all of the storage locations on the cylinder are accessible to the picking member. In such a configuration, the queue stations can communicate with the mono-axial picking member, for example, through gravity chutes, conveyor belts, or the like, the receiving ends of which are arrayed vertically adjacent to the picking member. As will be understood by those skilled in the art, other arcuate configurations of the present invention are possible.

Figure 3:
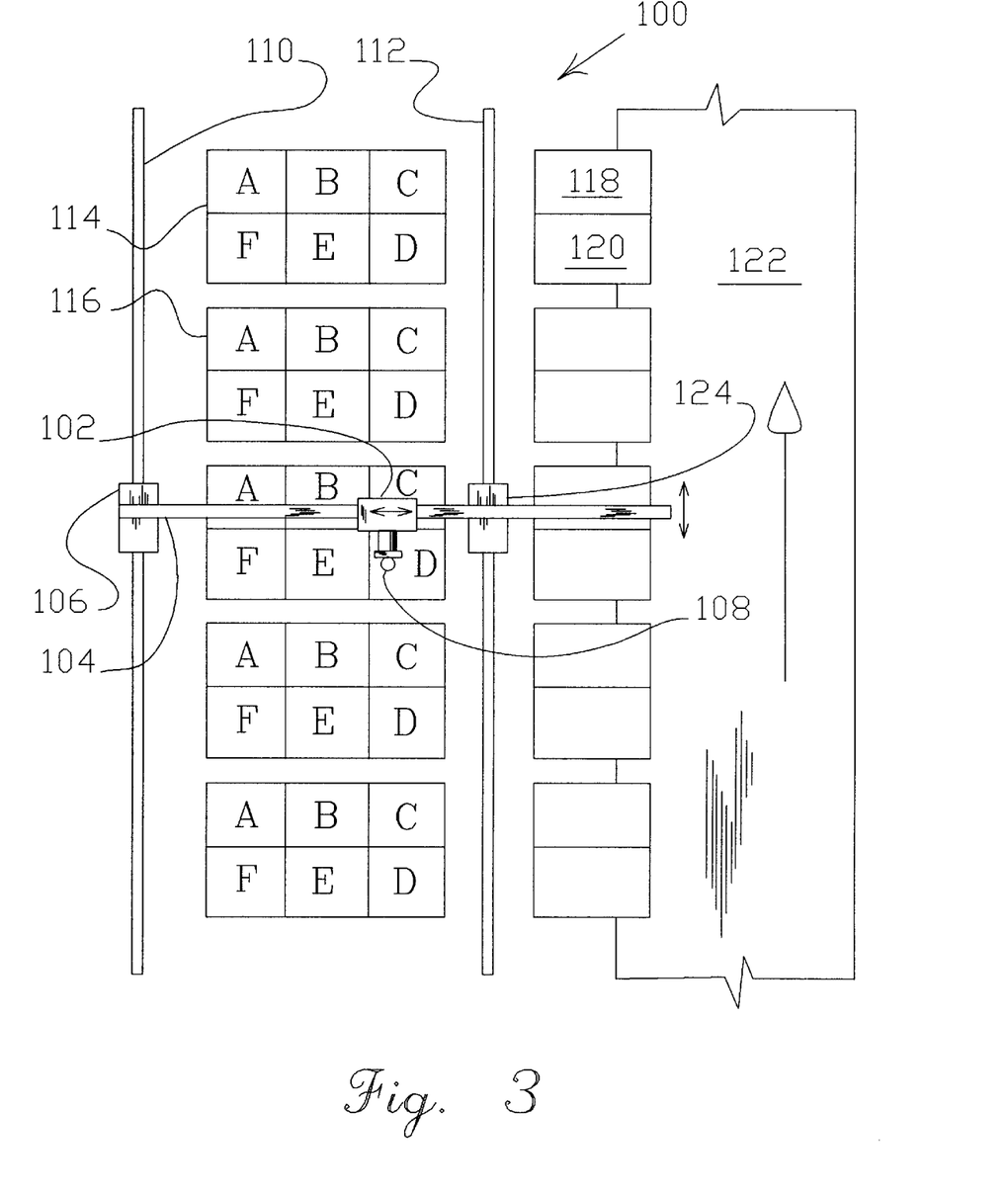
FIG. 3 is a schematic view of a preferred embodiment of the invention.

A preferred rectangularly operated picking station is illustrated schematically at 100 in FIG. 3. The embodiment in FIG. 3 is further illustrated in FIG. 5. Storage containers, typical ones of which are illustrated at 114 and 116, are positioned at predetermined locations between rails 110 and 112. Each of the storage containers includes a plurality of compartments or locations, typical ones of which are identified as A through F. A support frame or gantry 104 is mounted on carriages 106 and 124. Carriages 106 and 124 are mounted for synchronized longitudinal reciprocal movement along rails 110 and 112. A picking member or head 102 is mounted for lateral reciprocal movement along the full length of gantry 104. Object grasping element 108 is a part of picking member 102. The major moving components thus define a picking vehicle composed of carriages 106 and 124, picking head 102, and gantry 104. Generally, one or more electrical motors (not shown), which are provided to drive this picking vehicle and its components, are also mounted on and move with the vehicle. A bank of queue stations, typical ones of which are illustrated at 118 and 120, is positioned adjacent to and in dispensing relationship to a conveyor 122. These queue stations can be of any nature, particularly including those described with reference to the other figures. herein, or the like. The movement of the picking vehicle is limited to a defined rectangular area which permits the grasping element to pass over all of the storage locations and all of the queue stations in the system.

Figure 5:
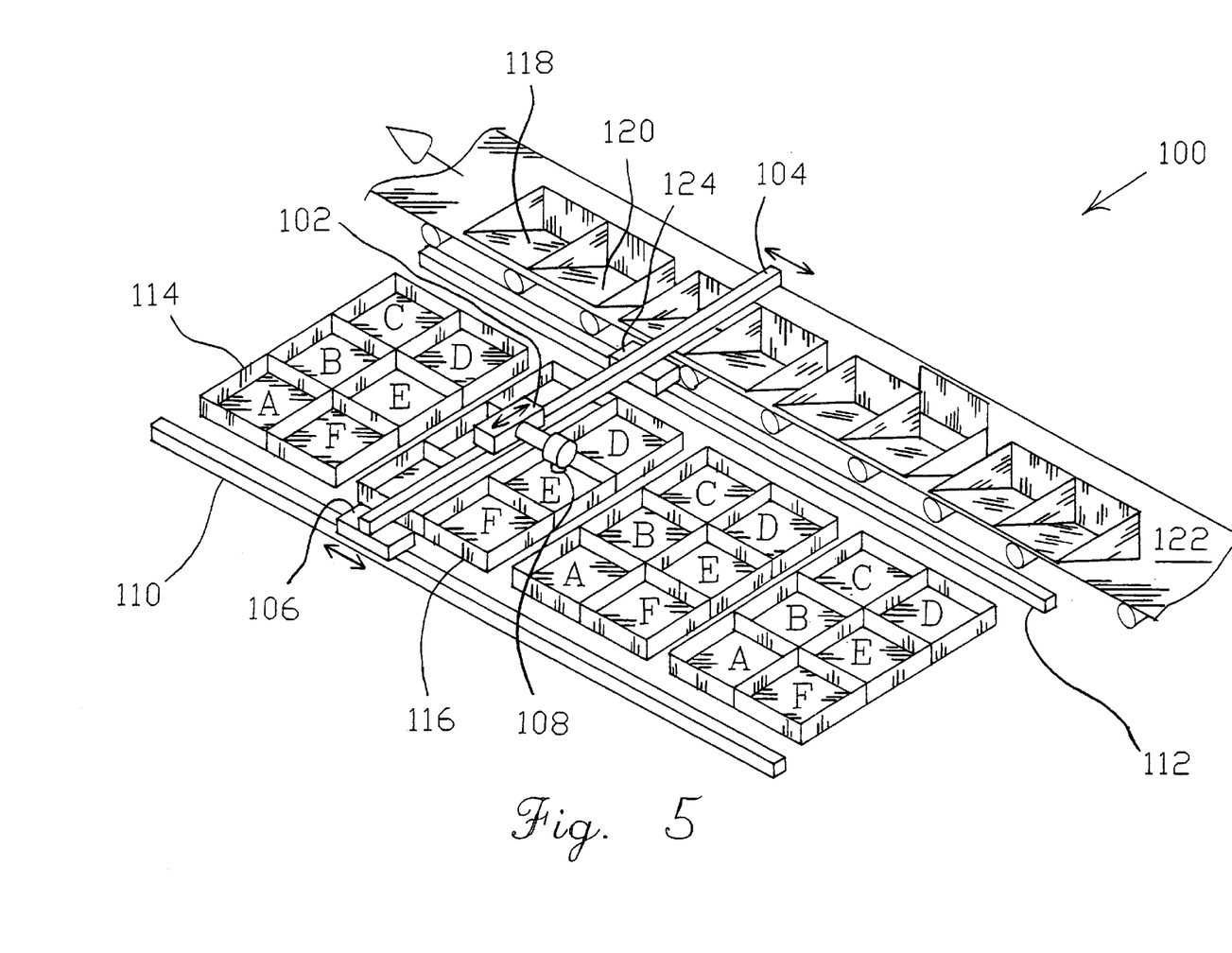
FIG. 5 is an isometric view of the preferred embodiment of FIG. 3.

Conveyor 122 preferably moves continuously at a constant rate in the direction indicated. Conveyor 122 can be of any nature, particularly including those described with reference to the other figures herein, or the like. Receiving receptacles or locations are carried by the conveyor 122 past, and in receiving relationship with, the queue stations.

The picking system illustrated in FIG. 3 and FIG. 5 operates on a rectangular grid with the rails 110, 112 positioned parallel to the "X" axis, and the mounting frame 104 positioned parallel to the "Y" axis. Each storage location in the bank of storage locations, and each queue station in the bank of queue stations is located at a unique coordinate or location on the rectangular grid. The length of the "Y" axis is minimized with this arrangement. Minimizing the length of the "Y" axis minimizes the mass of the picking vehicle. This in turn reduces the power which is required to drive the picking vehicle. If computer control capacity is provided in the picking vehicle, and control, data and coordination information is supplied to the picking vehicle by means of wireless transmissions, for example, infra red or radio frequency transmissions, or the like, the mass of the picking vehicle and associated trailing wires is further reduced.

For purposes of illustration, the queue stations are shown as being paired with, and the same width as, the compartments or locations in the storage containers. As will be understood by those skilled in the art, such pairing and width are not necessary. Conventional computer controls (not shown) are fully capable of positioning the picking member or head 102 over the desired queue station with out regard to any alignment between the storage locations and the queue stations.

Preferably, in each pass or cycle along the "X" axis over the storage locations, the picking member travels primarily in only one direction along the "X" axis from one end of the path defined by rails 110 and 112 to the other. A picking cycle is complete when the picking vehicle has moved from one end to the other of the path defined by the tracks. Small retro alignments to match the position of the desired queue station, or to visit an adjacent storage location, may be made, if necessary. Preferably, however, the picking vehicle does not move back along the "X" axis to reach compartments which have already been passed over in that cycle. This minimizes the velocity at which the picking vehicle must travel, as well as the acceleration loads experienced by the moving elements of the system. This minimizes the structural requirements for the vehicle, which minimizes the mass and the power which is required to drive the picking vehicle. Lower velocities and acceleration loads also minimize maintenance problems. Capital and operating costs are greatly reduced.

All of the objects or items which are to be picked during a particular cycle or cycles are contained on a work list which is maintained by the conventional computer system. The work list generally includes all of the objects needed to fill several individual orders. The individual orders, which combine to make up the larger list, may be conveniently considered as sub-sets of the larger list. Each of the objects on the larger list belongs to a sub-set. The information concerning the objects in the sub-sets is also maintained by the computer system. Conventional computer systems (not shown) maintain and store data which reflects the physical locations of all of the objects in the system, at all times, and throughout the system, including, for example, which queue stations contain which picked objects for which sub-sets. One or more receiving receptacles or locations on the moving conveyor 122 is designated to receive all of the objects for a specific sub-set. The receiving location for a particular sub-set is identified within a time frame which will permit all of the objects for a particular order or sub-set to be picked and placed in the respective queue stations before the receiving receptacle or location reaches those queue stations. As a receptacle or location which is designated to receive the objects in a particular order moves past a queue station which contains an object for that order or sub-set, the conventional computer control system controls the queue station so that the queue station discharges the object into the receptacle. The queue station is then immediately available to receive another object from the picking head. The discharge from the queue stations is selective in that a queue station will hold its contents as receiving locations pass by on the moving belt until the particular receiving location which is designated to be the consolidation location for the sub-set to which the contents of that queue station belong, comes into receiving relationship with the queue station.

By not designating the receiving location on the moving conveyor until the picking of the required objects for a sub-set has at least commenced, the operation of the picking head is buffered. If, for example, not all of the objects required for a particular order are picked in one cycle of the picking vehicle, those objects which have been picked are simply held in the queue stations until picking is completed during the next or subsequent cycles. As soon as picking for a particular order or sub-set is complete, or as soon as such picking is projected to be complete by the time the designated receiving location reaches the respective dispensing queue stations, that receiving location can be launched or designated on the conveyor. The provision of a large number of queue stations compared to the number of storage compartments or locations helps provide this flexibility. Also, the provision of a large number of queue stations relative to the receiving locations helps provide this flexibility. If the operation of the picking member is briefly interrupted, for example, because of a momentary supply problem, the system continues on consolidating sub-sets from the objects which have already been picked. This flexibility or buffering is made possible by the provision of a large number of queue stations relative to the other components in the system. As noted previously, there is preferably at least 1 queue station for every 4 to 12 storage locations. In general, there is at least 1, and, preferably, 3 to 6, or more, queue stations for every receiving location.

The picking stations according to the present invention can, if desired, be mirrored on two sides of a conveyor belt, thus approximately doubling the capacity of a system with but little extra space requirements. Generally, in such double systems the picking stations are mirrored on about the centerline of the conveyor.

The objects to which the picking systems according to the present invention can be applied span the entire spectrum of physical objects, including raw materials, intermediate components and finished goods. These picking systems find utility in a wide variety of retail, commercial and manufacturing operations. These picking systems are particularly useful in automated warehouses where large quantities of goods are stored in storage containers or totes on rotary carousels. Elaborate conveyor systems are generally provided to carry the storage containers between the rotary carousels and the picking systems.

A typical picking station, according to the present invention, includes a rectangular unit with an "X" axis of about 50 feet, and a "Y" axis of about 6 feet, positioned on one side of a conveyor belt which moves in a straight line at about 120 feet per minute. Where, for example, the objects to be picked are rectangular jewel cases, measuring about:

5.500×4.875×0.375 inches, and containing CD-ROM discs, the system preferably includes a bank of about 50 queue stations in the form of gravity feed chutes. A vacuum cup is provided as a part of the picking head to grasp the jewel cases and hold them as they are carried from the storage compartments to the respective queue stations. Receiving locations are positioned on the conveyor, spaced apart so that every third space is occupied by a location. The system is configured so that picks are continuously made of the closest downstream objects on the current pick list without any retro movement between containers. That is, the picking vehicle does not move back upstream to a just passed compartment to make a pick. Each picked object is deposited in its own queue station, that queue station being the one which is closest and available to the storage location from which the object was picked. The queue stations selectively deliver the objects therein to those preselected receiving locations which are designated to receive the objects for the specific order in question. Receptacles are placed on the moving conveyor at the receiving locations in order or sub-set sequence, with the receptacle for the first sub-set first. The queue stations are not utilized in any predetermined sequence other than that dictated by the picking member's placing picked objects on the closest available queue station after each pick. During one cycle the objects or items belonging in the first order or sub-set can be placed, for example, in the third, seventh, twelfth and twenty first queue stations, while the items for the second sub-set can, for example, be placed or deposited by the picking member in the first, fifth and thirty first queue stations. Preferably, the system is operated so as to keep the picking at least one cycle ahead of the consolidation. The CD-ROM jewel cases are located and tracked by SKU numbers. The rectangular array of storage compartments or picking locations in the storage containers are 5 wide in the "X" direction, and 6 deep in the "Y" direction. The storage containers are separated by a distance equal to the combined widths of about two compartments. The moving mass of the picking vehicle is approximately 150 pounds. As soon as the picking vehicle completes one picking cycle by coming to the end of the 50 foot long tracks, it begins a new cycle by reversing direction and beginning to traverse the length of the system in the opposite direction. At a throughput rate of approximately 1200 picks per hour, velocities in the "X" direction do not exceed approximately 30 inches per second, and the "G" forces do not exceed about 0.59 G's.

Throughout this specification the receiving receptacles have from time to time been described as locations on the conveyor or containers which are separable from the conveyor. In the various embodiments of the present invention, the receptacles can be separable, integral with the conveyor, or they can simply be locations on the conveyor which are individually tracked by the conventional computer control system, but are not delineated by physical barriers. Likewise, the compartments in the storage containers can be locations which are tracked by the computer system, but which are not defined by any physical barriers. For example, locations 36, 46 and 52 in FIG. 1 can be containers which are separable from or fixed to conveyor 38, or they may simply be areas on the conveyor surface which are invisible to the unaided eye, but are defined and tracked by the computer system.

The objects are provided for picking by being placed in the storage locations which are traversed by the picking head. Preferably, the storage locations are stationary, and only the picking member moves. Objects can be placed in the storage locations in a plurality of groups in a larger container, in smaller groups, or individually. When the objects are confined in large containers it is often convenient to remove and replace an entire large container. Stacks of identical objects may be replenished individually, for example, by moving such stacks from storage onto predesignated locations. The supply of objects can be replenished manually or the process can be mechanized. Mechanization can be provided, for example, by extending a gantry, such as that illustrated at 104 in FIG. 3 and FIG. 5, outwardly from carriage 104. As required, picking head 102 then moves out over the area where the stacks of objects are stored, picks up a stack, and delivers it to a designated storage location. In general, a separate grasping member is used which is adapted to handle a stack instead of individual objects.

The present invention generally finds its most beneficial application where the operation of the picking head is divorced from the consolidation phase. The picking head picks objects to fill a work list which lists objects that are ultimately destined for consolidation into several different sub-sets. The picking head selects objects to fill the work list based on the proximity of the stored objects to the downstream side of the picking head, rather than on their inclusion in any particular sub-set, or any other ranking. If an object is listed somewhere on the work list, and it is closer to the downstream side along the X axis of the picking head than any other object, it will be picked next. It will be deposited in substantially the closest available, for example, empty, queue station, which may be slightly upstream from the present location of the picking head, but, preferably, is parallel to or downstream along the X axis from the current position of the picking head. In general, if two queue stations are approximately the same distance from the storage location from which the object is picked, preferably the downstream queue station is selected even though it may be spaced a slightly greater distance from the storage location. Also, the selection of a queue station may, if desired, take into consideration the location of the next storage location from which a pick is to be made. As soon as the picked object is deposited in a queue station, the picking head again moves to the then closest downstream object on the work list. Priority is thus assigned at every pick to the position of the object to be picked. Priority is assigned on every deposit to substantially the closest available queue station to the storage location from which the object was picked. The picking head is freed from having to pick in order sequence by the buffering effect of the presence of a bank of queue stations.

Under certain limited circumstances it may occasionally be more efficient to pick in order sequence. If, for example, an order is so large that all but a few of the objects on the work list are assigned to one order, it may be more efficient to pick in order sequence. This avoids holding a few objects in their respective queue stations through several cycles of the picking vehicle. The present picking system provides the flexibility to accommodate such situations, and the like. This flexibility can be provided automatically, for example, by a computer instruction that if at any time 90 percent or more of the objects on a work list are for one order, the picking head is to pick based on order sequence instead of on position priority, and to continue picking on order sequence until such time as that percentage drops below 90 percent.

Figure 4:
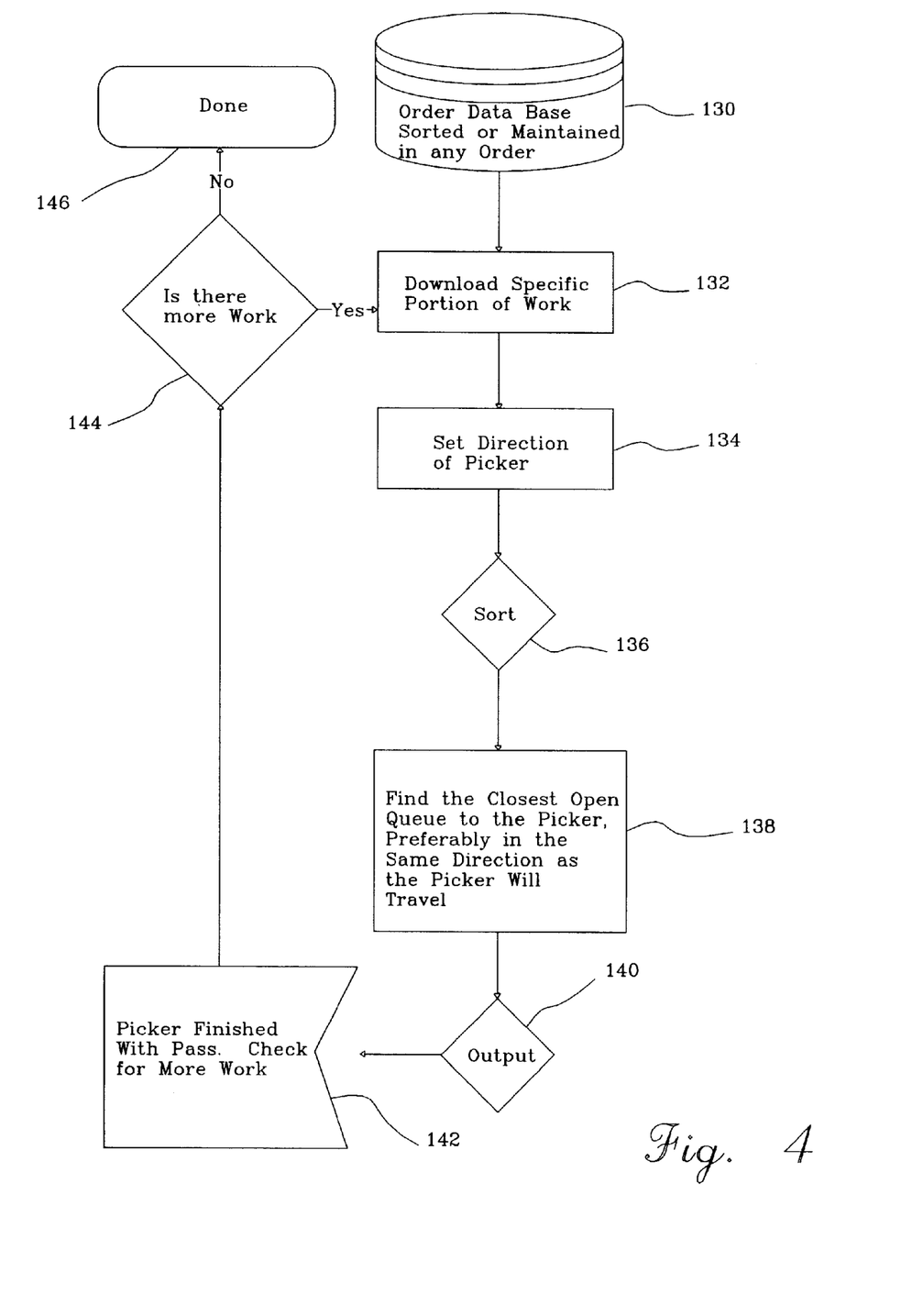
FIG. 4 is a flow diagram which illustrates the control and coordination of a picking system according to the present invention.

Referring particularly to FIG. 4, there is illustrated schematically the functions performed by the computer controls according to one embodiment of the present invention operating the system illustrated, for example, in FIG. 3 and FIG. 5. A database 130 is stored and maintained electronically in a conventional computer storage device. This database contains a list of all of the objects which are required to be picked. The list is stored in the form of records, each of which includes an item number and the sub-set or order number with which that item is associated. This database of required or ordered items is stored on a master host computer. The database is continually updated as orders for items are received and those orders are fulfilled. This master host computer generally communicates with a second host computer which is dedicated to the picking operation.

The master computer generally downloads a portion of the list to the second computer for processing through the picking operation. In general, the list is downloaded on a first-in first-out basis which is determined by the sub-set number. This downloaded portion of the list is processed for use in the picking operation. This downloading of a portion of the list from the master to the second computer is indicated at 132.

The second computer maintains, in addition to the downloaded list, a database which identifies all of the items in storage together with the position of the location where they are located. On a rectangular system, for example, each storage location is associated with a particular item identification, for example, a universal product code number, and an x-y coordinate. An inventory record of the quantity of the item at a particular x-y coordinate is also continuously maintained by the second computer. The location of each queue station is also identified by an x-y coordinate.

When the second computer receives the downloaded list it selects a first batch on a first-in first-out basis, based on the sub-set number. Preferably, the batch contains the items which are to be processed in one cycle by the picking member. This batch becomes the work list which is processed next by the picking station. The second computer instructs the picking member at 134 to position itself to start a new cycle and to move in a particular direction during the new cycle.

The second computer identifies the items on the work list with the particular x-y coordinate where the desired item is located in the storage array. The second computer, at 136, determines the order in which the items will be picked based on the downstream proximity of the storage location to the current position of the picking member. That is, the work list is arranged so that the picking member always picks from the location nearest to it. Generally, that is a downstream location.

The second computer, at 138, assigns a particular queue station to receive the picked item, and records which queue stations will contain the items for a particular sub-set. The queue stations are preferably assigned on the basis of downstream proximity to the current position of the picking member as it picks an item from a storage location.

The second computer transmits the work list to the picking computer at 140. The transmitted work list contains a series of x-y coordinates and instructions to pick at certain coordinates and deposit at other coordinates. Picking occurs at the storage locations and depositing occurs at the depositing locations. The picking computer directs the picking head between the designated coordinates, causes it to carry cut the designated picking or depositing, and reports its actions at each location to the second computer. When the picking member has completed the cycle, at 142, it checks with the second computer for the next work list. If there is another work list at 144, the cycle repeats itself. If there is not, the picking system goes idle at 146.

As will be understood by those skilled in the art, the system can be reloaded with items by substantially reversing the operation. That is, items can be brought into the queue stations, picked out of them by the picking member and carried to and deposited in the storage locations. In this operation, the buffering takes place between the loading of the queue stations and the loading of the storage locations. This operation is particularly useful, for example, in handling the restocking of returned items.

What has been described are preferred embodiments in which modifications and changes may be made without departing from the spirit and scope of the accompanying claims. Obviously many modifications and variations of the present invention are possible in light of the above teachings. It is therefore to be understood that, within the scope of the appended claims, the invention may be practiced otherwise than as. specifically described.

What is claimed is:

1. A high speed picking system including a plurality of storage locations adapted to contain objects to be picked, a plurality of queue stations, a plurality of receiving locations, and at least one moveably mounted picking member adapted to selectively pick individual ones of said objects from a predefined list of such objects, and to carry such individual ones of said objects to selected ones of said plurality of queue stations, said queue stations being adapted to receive such picked objects, to hold such picked objects temporarily, and to dispense such picked objects selectively to any one of said receiving locations, said plurality of queue stations being operative to selectively dispense between them a predefined sub-set of said predefined list of objects to a predetermined receiving location of said plurality of receivinq locations.

2. A high speed picking system including providing a plurality of storage locations adapted to contain objects to be picked, providing a plurality of queue stations, providing a plurality of receiving locations, providing at least one moveably mounted picking member, actuating said moveably mounted picking member to selectively pick individual ones of said objects from a predefined list of such objects and to carry such individual ones of said objects to selected ones of said plurality of queue stations, said queue stations receiving such picked objects, said queue stations holding such picked objects temporarily, and said queue stations dispensing such picked objects selectively to any predetermined ones of said receiving locations, said plurality of queue stations selectively dispensing between them a predefined sub-set of said predefined list of objects to one such predetermined receiving location.

3. An automated picking station including at least one moveably mounted picking vehicle, a plurality of storage locations where objects to be picked are located, a plurality of queue stations positioned adjacent to a moveable conveyor, and a plurality of receiving locations carried by said moveable conveyor, said picking station comprising:

said moveably mounted picking vehicle including an object grasping member and being moveably mounted to traverse said grasping member across all of said storage locations and queue stations, said grasping member being adapted to grasp an object in one of said storage locations and carry such grasped object to substantially the closest available queue station, each said queue station being adapted to receive such grasped object from said grasping member and to then deliver such grasped object to a predetermined receiving location of any one of said plurality of receiving locations.

4. A high speed picking system including a plurality of storage locations holding objects which are to be picked, a plurality of queue stations, at least one moveable conveyor including a plurality of object consolidating locations thereon, and at least one moveable picking head, said picking head being in picking relationship to said storage locations and in depositing relationship to said queue stations, and said queue stations being in selective dispensing relationship to said object consolidating locations, said high speed system comprising:

establishing a work list of the objects to be picked from said storage locations to be deposited into a predetermined object consolidating location;

actuating said picking head to pick a first said object from a first said storage location based upon the occurrence of said first object on said work list and the proximity of said first storage location to the current location of said picking head; and     said picking head depositing said first object in a first queue stations;

repeating said actuating and depositing until all said objects of said work list have been deposited into respective said queue stations;

selectively dispensing said objects from said queue stations into said predetermined object consolidating location.

5. A high speed picking system including a plurality of storage locations holding objects which are to be picked, a plurality of queue stations, at least one moveable conveyor including a plurality of object consolidating locations, and at least one moveable picking head, said picking head being in picking relationship to said storage locations and in depositing relationship to said queue stations, and said queue stations being in dispensing relationship to each said object consolidating location, said high speed system comprising:

establishing a work list of the objects to be picked from said storage locations, said work list including a plurality of different sub-set lists, each said sub-set list to be associated with its own said consolidating location;

actuating said picking head to pick a first object from a first storage location based upon the occurrence of said first object on said work list and the proximity of said first storage location to the current location of said picking head;

said picking head depositing said first object in a first queue station, said first queue station being substantially the closest available queue station to said first storage location;

repeating said actuating and depositing for at least a second object from a second storage location to a second queue station, said second queue station being substantially the closest available queue station to said second storage location; and,     for each said sub-set list, selectively dispensing such picked objects from said queue stations to said associated object consolidating location based upon the listing of such picked objects of said sub-set list.

6. A high speed picking system including a plurality of storage locations holding objects which are to be picked, a plurality of queue stations, at least one moveable conveyor including a plurality of object consolidating locations, and at least one moveable picking head, said picking head being in picking relationship to said storage locations and in depositing relationship to said queue stations, and said queue stations being in selective dispensing relationship to each said object consolidating location, said high speed system comprising:

establishing a work list of the objects to be picked from said storage locations;

actuating said picking head to pick a first said object from a first said storage location based upon the occurrence of said first object on said work list; and     selecting a first queue station based upon the proximity of said first storage location to said first queue station; and     said picking head depositing said first object in said first queue station.

7. A high speed picking system of claim 1 wherein said predetermined receiving locations are moveably mounted relative to said plurality of queue stations.

8. A high speed picking system according to claim 2 including actuating said moveably mounted picking member to selectively pick individual ones of said objects from a predefined list of such objects based on the proximity of said individual ones of said objects to the position of said moveably mounted picking member.

9. A high speed picking system including a plurality of storage locations adapted to contain objects to be picked, a plurality of queue stations, a plurality of receiving stations, and at least one moveably mounted picking member, said moveably mounted picking member being in object picking relationship to said storage locations and in object dispensing relationship to said queue stations, said moveably mounted picking member being adapted to selectively pick individual ones of said objects from a predefined list of such objects, and to carry such individual ones of said objects to selected ones of said plurality of queue stations, said queue stations being in temporary holding and selective release relationship to said objects, said plurality of queue stations being adapted to selectively release between them a predefined sub-set of said predefined list of objects to one such receiving location.

10. A high speed picking system comprising:

at least one object picking head, a plurality of object storage locations, a plurality of object queue stations, and a plurality of object consolidation locations;

said picking head, said storage locations, and said queue stations being moveably mounted relative to one another;

said picking head including an object holding member, said object holding member being mounted in:
        (a) a picking relationship to selected objects at said storage locations
        (b) a holding relationship to such selected objects as said picking head, said storage locations, and queue stations are moved relative to one another, and
        (c) a dispensing relationship to said queue stations, said queue stations being mounted to:
            (a) receive such selected objects from said object holding member,
            (b) to temporarily hold such selected objects, and
            (c) to selectively discharge such selected objects to any selected ones of said object consolidation locations.

11. A high speed picking system of claim 10 wherein said object holding member is mounted to pick the closest selected object and to dispense to the closest available queue station.

\* \* \* \* \*